United States Patent [19]
Aubin et al.

[11] Patent Number: 5,662,008
[45] Date of Patent: Sep. 2, 1997

[54] EXTENDED CONTACT HARMONIC DRIVE DEVICES

[75] Inventors: Joseph J. Aubin, Georgetown, Mass.; Yoshichika Yamada, Oogaki, Japan; Etsuro Komori, Peabody, Mass.

[73] Assignee: Teijin Seiki Boston, Inc., Peabody, Mass.

[21] Appl. No.: 540,195

[22] Filed: Oct. 6, 1995

Related U.S. Application Data

[63] Continuation-in-part of Ser. No. 113,285, Aug. 30, 1993, Pat. No. 5,456,139.

[51] Int. Cl.$^6$ ............................................. F16H 1/32
[52] U.S. Cl. ............................................. 74/640
[58] Field of Search .................. 74/640, 462; 475/162

[56] References Cited

U.S. PATENT DOCUMENTS

| | | | |
|---|---|---|---|
| 4,703,670 | 11/1987 | Kondo | 74/640 |
| 4,823,638 | 4/1989 | Ishikawa | 74/640 |
| 5,388,483 | 2/1995 | Ishida et al. | 74/640 |
| 5,456,139 | 10/1995 | Aubin | 74/640 |
| 5,458,023 | 10/1995 | Ishikawa et al. | 74/640 |
| 5,485,766 | 1/1996 | Ishikawa | 74/640 |

FOREIGN PATENT DOCUMENTS

WO94/12808 6/1994 WIPO.
WO94/12809 6/1994 WIPO.

OTHER PUBLICATIONS

O'Neil, P. V., "Numerical Methods." In *Advanced Engineering Mathematics*, 2d Edition, J. Harrison et al., eds. (Belmont, CA: Wadsworth, Inc.), Ch. 20, pp. 1062–1065.

*Primary Examiner*—Khoi Q. Ta
*Attorney, Agent, or Firm*—Hamilton, Brook, Smith & Reynolds, P.C.

[57] ABSTRACT

The present invention relates to an extended tooth contact harmonic drive gearing apparatus for transmitting rotary motion from an input drive to an output drive through mating contact between the gear teeth of a flexspline and a rigid circular spline, the flexspline being rotated into non-circular shape by a wave generator. The profile of the flexspline teeth are generated to cause the teeth of the flexspline to contact more than one tooth of the circular spline by forming a face profile on the flexspline teeth in accordance with a predetermined equation while the flank tooth profile of the circular spline is formed of a known arc segment, such as, a circle, ellipse or parabola.

5 Claims, 3 Drawing Sheets

EXTENDED CONTACT HARMONIC DRIVE DEVICES

RELATED APPLICATIONS

This is a Continuation-in-Part of U.S. Ser. No. 08/113,285, filed Aug. 30, 1993, now U.S. Pat. No. 5,456,139, and incorporated herein in its entirety by reference.

BACKGROUND OF THE INVENTION

1. Field of the Invention

This invention relates to strain wave gearing, and more particularly to an improved tooth profile of a flexspline and a circular spline in harmonic drive devices.

2. Prior Art

The original harmonic drive strain wave gearing was introduced by Musser in U.S. Pat. No. 2,906,143. A harmonic drive strain wave gear comprises a rigid circular spline having "n" teeth, a flexspline having fewer than "n" teeth ("n" being a positive integer) and being disposed in the circular spline, and a rotatable wave generator disposed in the flexspline to deform the flexspline into a lobed configuration, such as an oval shape, so as to force the flexspline into engagement with the circular spline at two points of the major axis of the formed ovaloid. The wave generator may include an oval cam plate and a bearing snugly mounted on the outer periphery of the camplate. The outer bearing is matingly inserted into the flexspline so as to deform it to the peripheral contour of the camplate. An input shaft attached to the camplate provides rotation thereto, causing the ovaloid configuration of the flexspline to be correspondingly rotated. During such rotation, the circular spline is induced to rotate relative to the flexspline by an amount proportional to the difference in the number of teeth between the flexspline and the circular spline. When an output shaft is arranged on either the flexspline or the circular spline, that output shaft is rotated very slowly in comparison to its input shaft. Such harmonic drive strain wave gearing has been utilized in machinery requiring a high reduction ratio.

A recent attempt at improved tooth profile design is shown in U.S. Pat. No. 4,823,638 to Ishikawa, wherein the engagement between the flexspline and the circular spline is deemed to be an approximation to that of a rack mechanism. The tooth profile of the engaging splines is defined by a transformation of an original curve by the application of a reduced ½ scale to a corresponding similar figure, that is, a mapping curve derived by a similarity transformation from the movement locus of the crest of the flexspline relative to the circular spline.

The design of the '638 gear tooth is therefore based on a simplified traditional rack mechanism approximation.

In fact, the gear teeth are not located on a simple linear rack. The circular spline teeth are located on a circle and the flexspline teeth are located on an oval surface formed by the wave generator. These two curved surfaces cause an inclination angle change between a tooth on the flexspline relative to the circular spline as the tooth moves into the engagement from the minor axis to the major axis. Such inclination angle is ignored when it is assumed that the circular spline and the flexspline are straight racks.

More recently, in the referenced U.S. patent application Ser. No. 08/113,285 an improvement in flexspline tooth profiles was obtained by taking into account precessing of the tooth angle at the front and back of the tooth lobe as the oval wave generator is rotated.

BRIEF SUMMARY OF THE INVENTION

In accordance with the present invention extended tooth contact engagement with reduced tooth stress is achieved by first defining the tooth face profile of one of the gears, preferably the circular spline by a simple well known geometrical arc segment such as a circular, parabolic, or elliptical arc segment. Next, the tooth face profile of the other gear, preferably the flexspline is defined by a curve shape that allows several teeth to remain in contact while the wave generator is rotated. Furthermore, the transition region between tooth flank and tooth face is made continuous, and thereby smoothed out, by using a straight line segment for this portion of the flexspline tooth profile. The aforesaid curve shape that allows several teeth to remain in contact is determined by establishing the movement locus of a point on the flexspline tooth in relationship to a point of contact between the face profile of the flexspline teeth and face profile of the circular spline teeth and subtracting the tangential component shift due to tooth inclination as the wave generator is rotated.

The invention thus comprises an extended contact harmonic drive gearing apparatus for transmitting rotary motion from an input drive to an output drive, comprising: a rigid circular spline having gear teeth thereon; a flexible flexspline having gear teeth thereon arranged radially adjacent the rigid circular spline. The flexspline face tooth profile for a preferred circular arc embodiment of an extended contact harmonic drive gearing apparatus is defined by the following equations:

$$xf = x_2 + (-a - R_i) - u \cdot h$$

$$= \frac{R_i \cdot \left|\frac{dy_0}{d\theta}\right|}{\sqrt{\left(\frac{dx_0}{d\theta}\right)^2 + \left(\frac{dy_0}{d\theta}\right)^2}} - (x_0 + R_i) - u \cdot h$$

$$yf = -(Y_2 - b)$$

$$= -\frac{R_i \cdot \left|\frac{dx_0}{d\theta}\right|}{\sqrt{\left(\frac{dx_0}{d\theta}\right)^2 + \left(\frac{dy_0}{d\theta}\right)^2}} + y_0$$

wherein $-u \cdot h$ is the tooth inclination correction factor $$h = y_0 - y_1$$

$$u = \tan^{-1}\left(-\frac{1}{r} \cdot \frac{dr}{d\phi}\right)$$

$x_2$ is the tangential axis coordinate of a point on the flexspline tooth face curve;

$Y_2$ is the radial axis coordinate of a point on the flexspline tooth face curve; and the circular spline face tooth profile is defined by a circle with radius $R_r = \sqrt{(x_c - a)^2 + (y_0 - b)^2}$ in which a, b are the center coordinates of a circle.

BRIEF DESCRIPTION OF THE DRAWINGS

The objects and advantages of the present invention will become more apparent when viewed in conjunction with the following drawings, in which.

DESCRIPTION OF THE PREFERRED EMBODIMENTS

Figure 1:
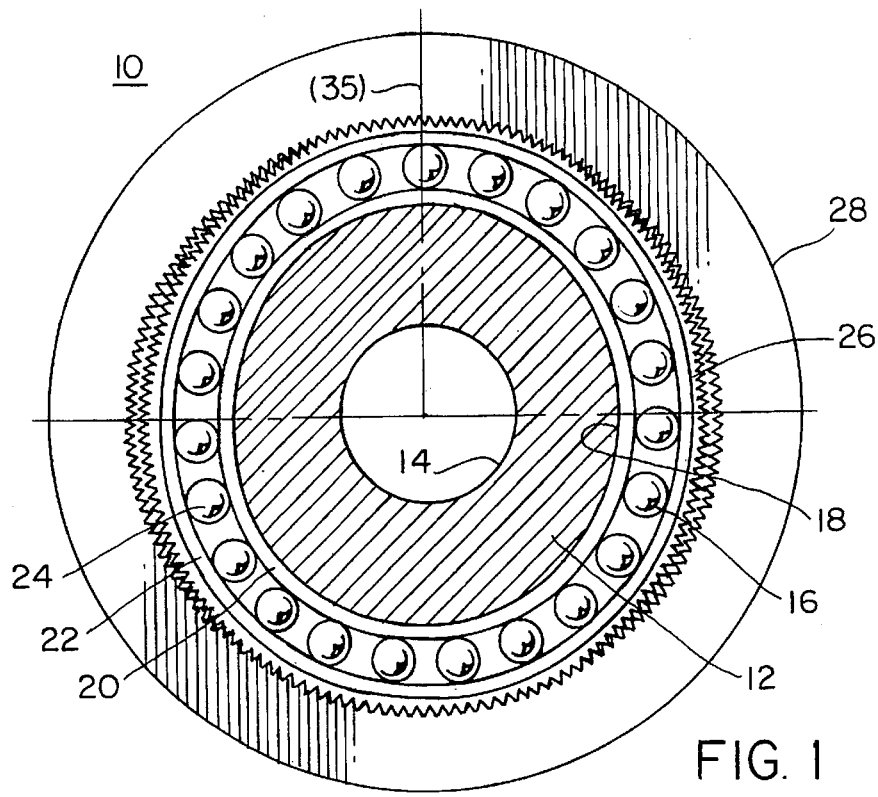
FIG. 1 is a front partial view of a harmonic drive gearing assembly constructed according to the principles of the present invention.
Figure 2:
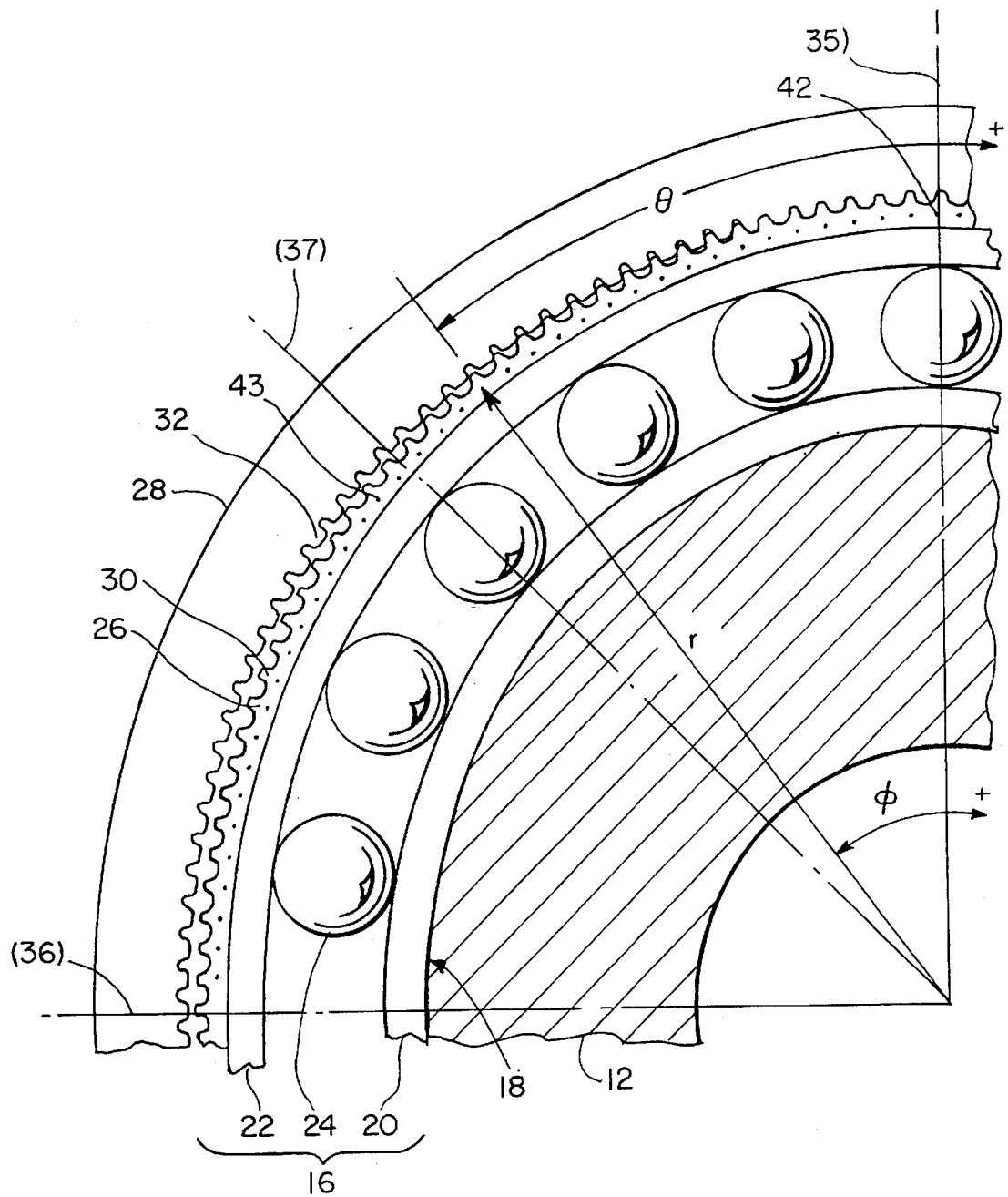
FIG. 2 is a view of a quadrant of the teeth of a flexspline and a circular spline shown in FIG. 1, showing the progressive points of tooth engagement therebetween.

Referring to the drawings, and particularly to FIGS. 1 and 2, there is shown in an enlarged frontal view, a harmonic drive gearing assembly 10, having a tooth profile which is the subject of the present invention.

The harmonic drive gearing assembly 10 comprises a planar generally oval shaped wave generator (cam plate) 12 having a bore 14 for attachment to a drive shaft, not shown.

The wave generator 12 has an outer periphery 18 with a bearing assembly 16 pressed thereabout. The bearing assembly 16 consists of an inner race 20, an outer race 22, and a plurality of roller members 24 rotatively distributed therebetween. A deformable flexspline 26 is disposed outwardly of and snugly engaged with the outer race 22 of the bearing assembly 16. A rigid fixed circular spline 28 is disposed radially outwardly of the deformable flexspline 26. An array of gear teeth 30 (as shown in FIG. 2) is arranged on the outer periphery of the flexspline 26, and another array of gear teeth 32 is arranged on the inner periphery of the circular spline 28 in a matable relationship therebetween.

The major axis of the wave generator 12 and the flexspline 26 is represented, in FIG. 2, at the 12 o'clock position (35), and likewise, the minor axis in FIG. 2 is at the 9 o'clock position (36). The maximum inclination of the teeth 30 of the flexspline 26 are found at the mid-point (37) between the major and minor axes 35 and 36.

Figure 4:
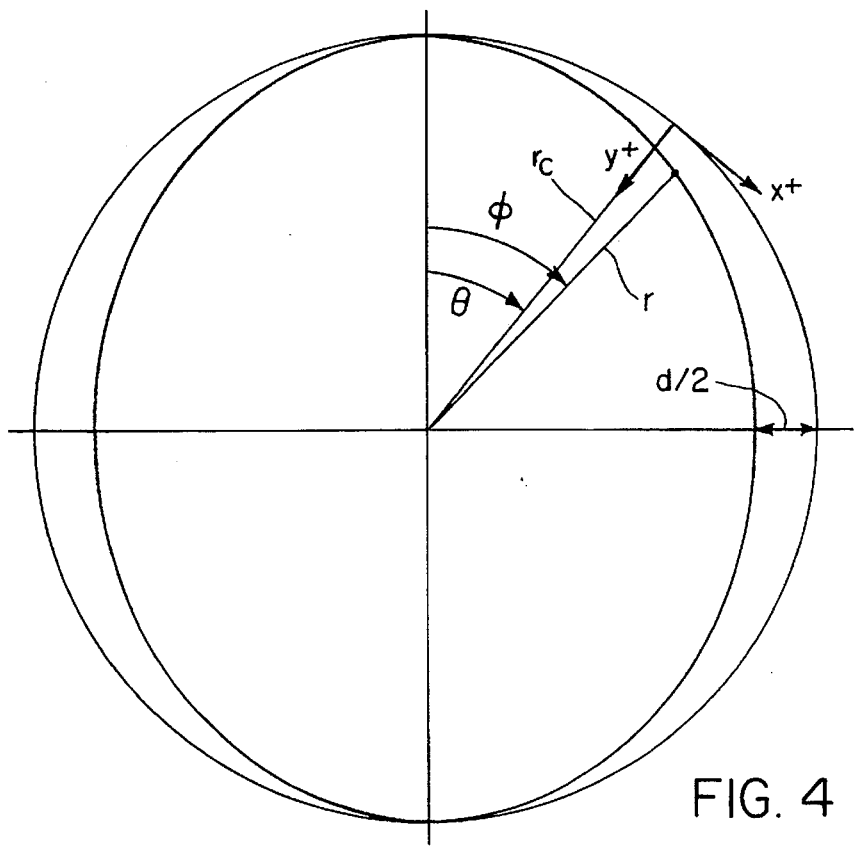
FIG. 4 is a drawing illustrating the coordinate systems used in drawing the geometric expressions for the profile curve equations of the present invention.
Figure 3:
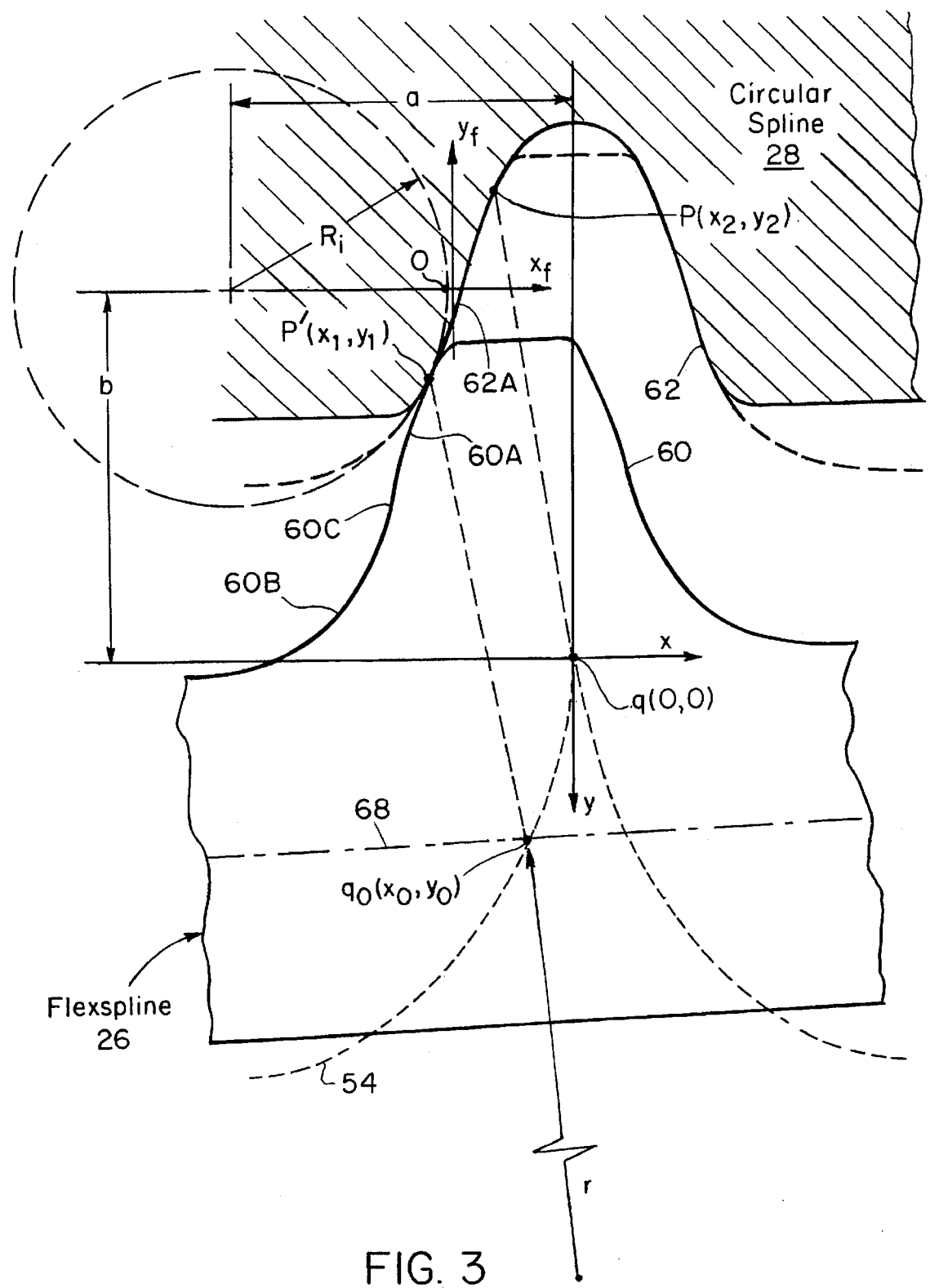
FIG. 3 is a frontal enlarged view of a flexspline tooth engaging a pair of teeth of the circular spline, showing the tooth engagement of the present invention and superimposed thereon are geometric expressions useful in explaining how the curve equations for the various tooth profiles were determined.

Referring now to FIGS. 3 and 4, the derivation of the curves defining the tooth profiles of the flexspline 26 and the circular spline 28 will now be explained in connection therewith. FIG. 3 depicts one tooth 60 of the flexspline 26 at a point of contact $P'(x_1 y_1)$ with the face 62A of a tooth 62 of the circular spline 28. The tooth 60 has an upper face profile curve at 60A and a lower flank profile curve at 60B joined by a straight line transitional profile at 60C. The movement locus of the flexspline 26 describes the path of a point on the flexspline neutral on plane 68 as it is rotated by a wave generator (not shown). The movement locus is designated 54 and is shown by dotted lines. Dashed lines 68 delineate the neutral on plane of the flexspline 26 which does not change length as the flexspline is distorted by the waveform generator (not shown). When the origin of the flexspline is moved from q(0,0) to a point $q_0$, $q'(x_0 Y_0)$ on its movement locus; the point $P(x_2, Y_2)$ on the tooth profile face 60A moves to the contact point P' $(x_1 Y_1)$ with the face 62A of circular spline 28.

The curve equations for the face of tooth 60 are derived as follows:

The movement locus for the point q the flexspline tooth 60 is:

$$r = r_c - \frac{d}{2}(1 - \cos 2\phi)$$  1(a)

$$x = r \cdot \sin(\phi - \theta)$$  1(b)

$$y = r_c - r \cdot \cos(\phi - \theta)$$  1(c)

wherein $-\pi/2 \leq \theta \leq 0$; and wherein x is a coordinate in the tangential direction;

Y is a coordinate in the radial direction;

$r_c$ is the flexspline major axis radius as shown in FIG. 4;

d/2 is one-half of the displacement d of the deformed flexspline;

θ is the angle of rotation of the wave generator;

(φ,r) are the polar coordinates of the neutral surface of the flexspline.

The addendum arc (circle) equation for the circular spline tooth profile is:

$$(x_c - a)^2 + (y_c - b)^2 = R_i^2$$  2 for a circle with radius $R_i$ in which a and b are the center coordinates of the circle.

The point q' is located on the movement locus, q's coordinates are as follows:

$$r_0 = r_c - \frac{d}{2}(1 - \cos 2\phi_0)$$  1(a)'

$$x_0 = r_0 \cdot \sin(\phi_0 - \theta_0)$$  1(b)'

$$y_0 = r_c - r_0 \cdot \sin(\phi_0 - \theta_0)$$  1(c)'

The coordinates of the contact points P' have the following relationship with points q' of the locus movement:

$$x_1 = x_2 + x_0$$  3(a)

$$Y_1 = Y_2 + y_0$$  3(b)

φ and θ are related by equation 4 below:

$$r_c \cdot \theta = \int r \cdot d\phi$$
$$= \left(r_c - \frac{d}{2}\right)\phi + \frac{d}{4}\sin 2\phi$$  4

Since P' is located on the circular arc of the tooth face of tooth 62 of circular spline 28, $X_c$ and $Y_c$ in equation 2 can be replaced by $X_1$ and $Y_1$.

Since P comes in contact with P', the tangent angle of the flexspline face curve at point P should be the same as the circular spline curve at P';

or:

$$\frac{dY_1}{dX_1} = \frac{dY_2}{dX_2}$$  5

Coordinates $X_2$ and $Y_2$ can therefore be replaced with equations 3a and 3b respectively:

$$\frac{dY_2}{dX_1} = \frac{d(Y_1 - y_0)}{d(X_1 - x_0)}$$  6 or

-continued $$\frac{dY_1}{dX_1} = \frac{dY_2}{dX_2} \quad \text{7(a)}$$

$$= \frac{d(Y_1 - y_0)}{d(X_1 - x_0)}$$

$$= \frac{d(Y_1 - y_0)}{d\theta} \bigg/ \frac{d(X_1 - x_0)}{d\theta}$$

$$= \left(\frac{dY_1}{d\theta} - \frac{dy_0}{d\theta}\right) \bigg/ \left(\frac{dX_1}{d\theta} - \frac{dx_0}{d\theta}\right)$$

$$\frac{dY_1}{d\theta} \bigg/ \frac{dX_1}{d\theta} = \left(\frac{dY_1}{d\theta} - \frac{dy_0}{d\theta}\right) \bigg/ \left(\frac{dX_1}{d\theta} - \frac{dx_0}{d\theta}\right)$$

$$\frac{dY_1}{d\theta} \left(\frac{dX_1}{d\theta} - \frac{dx_0}{d\theta}\right) = \frac{dX_1}{d\theta} \left(\frac{dY_1}{d\theta} - \frac{dy_0}{d\theta}\right) \text{ therefore}$$

$$\frac{dY_1}{d\theta} \cdot \frac{dx_0}{d\theta} = \frac{dX_1}{d\theta} \cdot \frac{dy_0}{d\theta}$$

$$\frac{dY_1}{dX_1} = \frac{dy_0}{d\theta} \bigg/ \frac{dx_0}{d\theta} \quad \text{7(b)}$$

Here, $Y_0$ and $x_0$ have only one function $\theta$. Note: $\phi$ can be represented by $\theta$ by adapting the Newton-Raphson method (see text "Advanced Engineering Mathematics" 2nd Ed. Peter V. O'Neil© 1987, Wadsworth, Inc., pp. 1062–1065 incorporated herein by reference) to equation 4. So that $X_1$ has two functions: $Y_1$ and $\theta$. $Y_1$ needs to be replaced by an equation about $X_1$ and $\theta$ as follows:

First we differentiate Equation 2' about coordinate $X_1$, and solve for $dY_1/dx_1$, as follows:

$$(X_1 - a)^2 + (Y_1 - b)^2 = R_i \quad 2'$$

$$2(X_1 - a) + 2(Y_1 - b) \cdot \frac{dY_1}{dX_1} = 0 \quad 8$$

$$\frac{dY_1}{dX_1} = -\frac{(X_1 - a)}{(Y_1 - b)}$$

$(Y_1-b)$ can be replaced by Eq 2'.

$$Y_1 - b = \sqrt{R_i^2 - (X_1 - a)^2} \quad 9$$

$$\frac{dY_1}{dX_1} = -\frac{X_1 - a}{\sqrt{R_i^2 - (X_1 - a)^2}}$$

$dY_1/dX_1$ can be replaced by Eq. 7(b). Making an equation about $X_1$–a.

$$\frac{dy_0}{d\theta} \bigg/ \frac{dx_0}{d\theta} = -\frac{X_1 - a}{\sqrt{R_i^2 - (X_1 - a)^2}} \quad 10$$

$$X_1 - a = \frac{R_i \cdot \left|\frac{dy_0}{d\theta}\right|}{\sqrt{\left(\frac{dx_0}{d\theta}\right)^2 + \left(\frac{dy_0}{d\theta}\right)^2}}$$

Making an equation about $Y_1$–b with Eq. 2' and 10 yields:

$$Y_1 - b = \frac{R_i \cdot \left|\frac{dx_0}{d\theta}\right|}{\sqrt{\left(\frac{dx_0}{d\theta}\right)^2 + \left(\frac{dy_0}{d\theta}\right)^2}} \quad 11$$

$dx_0/d\theta$ and $dy_0/d\theta$ are determined by differentiation of Eq. 1' by $\theta$:

$$\frac{dr_0}{d\theta} = -d \cdot \sin 2\phi_0 \cdot \frac{d\phi}{d\theta} \quad \text{12(a)}$$

$$\frac{dx_0}{d\theta} = \frac{dr_0}{d\theta} \cdot \sin(\phi_0 - \theta_0) + r_0 \cos(\phi_0 - \theta_0) \cdot \left(\frac{d\phi}{d\theta} - 1\right) \quad \text{12(b)}$$

$$\frac{dy_0}{d\theta} = -\frac{dr_0}{d\theta} \cdot \cos(\phi_0 - \theta_0) + r_0 \sin(\phi_0 - \theta_0) \cdot \left(\frac{d\phi}{d\theta} - 1\right) \quad \text{12(c)}$$

$\frac{d\phi}{d\theta}$ is obtained from Eq. 4.

$$\frac{d\phi}{d\theta} = \frac{r_c}{r_c - \frac{d}{2}(1 - \cos 2\phi)} = \frac{r_c}{r_0} \quad 13$$

The coordinates of a point P on the face 60A of the tooth profile of the flexspline 26 which maintains contact with a circular profile of tooth 62 on the face of the circular spline 28 throughout a portion of the movement locus 54 are obtained from Eqs. 10, 11, 12, 3 and 1 as follows:

$$X_2 = X_1 - x_0 \quad 14$$

$$= \frac{R_i \cdot \left|\frac{dy_0}{d\theta}\right|}{\sqrt{\left(\frac{dx_0}{d\theta}\right)^2 + \left(\frac{dy_0}{d\theta}\right)^2}} + a - x_0$$

$$Y_2 = Y_1 - y_0 \quad 15$$

$$= \frac{R_i \cdot \left|\frac{dx_0}{d\theta}\right|}{\sqrt{\left(\frac{dx_0}{d\theta}\right)^2 + \left(\frac{dy_0}{d\theta}\right)^2}} + b - y_0$$

P's coordinate system has its origin on point q. Changing the origin to point O in the diagram on FIG. 3. Then, adding a tooth inclination correction of minus u·h yields:

$$xf = X_2 + (-a - R_i) - u \cdot h \quad 16$$

$$= \frac{R_i \cdot \left|\frac{dy_0}{d\theta}\right|}{\sqrt{\left(\frac{dx_0}{d\theta}\right)^2 + \left(\frac{dy_0}{d\theta}\right)^2}} + y_0 - (x_0 + R_i) - u \cdot h$$

$$yf = -(Y_2 - b) \quad 17$$

$$= -\frac{R_i \cdot \left|\frac{dx_0}{d\theta}\right|}{\sqrt{\left(\frac{dx_0}{d\theta}\right)^2 + \left(\frac{dy_0}{d\theta}\right)^2}} + y_0$$

wherein $$h = y_0 - Y_1 \quad 18$$

and $$u = \tan^{-1}\left(-\frac{1}{r} \cdot \frac{dr}{d\phi}\right) \quad 19$$

Equations 16 and 17 define the face curve of a flexspline tooth profile which will stay in substantial contact with a face of a tooth of a fixed circular spline throughout a substantial portion of the movement locus of the flexspline provided the profile of the face of the circular spline is defined by a circular segment. The remainder of the flexspline tooth profile i.e. the flank profile is preferably a circular segment matching the circular spline face segment. A short transition region is also necessary to join the flank and face segments and this should be a smooth linear curve or a straight line segment.

Equivalents

Those skilled in the art will recognize, or be able to ascertain using no more than routine experimentation, many equivalents to specific embodiments of the invention described specifically herein. For example, while the invention has been explained in connection with a simple circular arc, other arcs, such as, a parabola or an ellipse are contemplated, in which the equation for an ellipse or parabola would be substituted for equation 2 above. Such equivalents are intended to be encompassed in the scope of the following claims.

We claim:

1. A harmonic drive gearing apparatus for transmitting rotary motion from an input drive to an output drive, comprising:

a circular spline having gear teeth thereon said circular spline gear teeth having a face profile and a flank profile;

a flexspline having gear teeth thereon arranged radially adjacent said circular spline, said flexspline gear teeth having a face profile and a flank profile and a transition region therebetween;

a non-circular wave generator having a major axis and a minor axis arranged radially adjacent said circular spline, and adapted to deform said flexspline when rotated, to generate relative motion between the flexspline and the circular spline; and wherein at least a face profile of the circular spline gear teeth is defined by an arc segment of known curvature while a face profile of the flexspline gear teeth is defined by the equations:

$$x_f = \left[ R_i \cdot \left| \frac{dy_o}{d\theta} \right| \div \sqrt{\left(\frac{dx_0}{d\theta}\right)^2 + \left(\frac{dy_0}{d\theta}\right)^2} \right] - (x_0 + Ri) - u \cdot h$$

and $$y_f = \left[ R_i \cdot \left| \frac{dx_o}{d\theta} \right| \div \sqrt{\left(\frac{dx_0}{d\theta}\right)^2 + \left(\frac{dy_0}{d\theta}\right)^2} \right] + y_0$$

and $$h = y_0 - Y_1 \text{ and } u = \tan^{-1}\left(-\frac{1}{r} \cdot \frac{dr}{d\phi}\right)$$

2. The apparatus of claim 1 wherein the transition region has a straight line profile.

3. The apparatus of claim 1 wherein the arc segment curvature is from the group of curves comprising circles, ellipses, or parabolas.

4. A harmonic drive gearing apparatus for transmitting rotary motion from an input drive to an output drive, comprising:

a circular spline having gear teeth thereon said circular spline gear teeth having a face profile and a flank profile;

a flexspline having gear teeth thereon arranged radially adjacent said circular spline, said flexspline gear teeth having a face profile and a flank profile;

a wave generator having a major axis and a minor axis arranged radially adjacent said circular spline, and adapted to deform said flexspline when rotated, to generate relative motion between the flexspline and the circular spline; and wherein at least a face profile of the circular spline gear teeth is defined by a circular arc segment while a face profile of the flexspline gear teeth is defined by the equations:

$$x_f = \left[ R_i \cdot \left| \frac{dy_o}{d\theta} \right| \div \sqrt{\left(\frac{dx_0}{d\theta}\right)^2 + \left(\frac{dy_0}{d\theta}\right)^2} \right] - (x_0 + Ri) - u \cdot h$$

and $$y_f = \left[ R_i \cdot \left| \frac{dx_o}{d\theta} \right| \div \sqrt{\left(\frac{dx_0}{d\theta}\right)^2 + \left(\frac{dy_0}{d\theta}\right)^2} \right] + y_0$$

and $$h = y_0 - Y_1 \text{ and } u = \tan^{-1}\left(-\frac{1}{r} \cdot \frac{dr}{d\phi}\right).$$

5. The apparatus of claim 4 including a transition region between the face and flank profile of the flexspline gear teeth.

* * * * *